(12) United States Patent
Kim et al.

(10) Patent No.: US 9,516,510 B2
(45) Date of Patent: Dec. 6, 2016

(54) METHOD FOR TRANSMITTING/RECEIVING A SIGNAL IN A WIRELESS COMMUNICATION SYSTEM

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 14/115,133

(22) PCT Filed: May 2, 2012

(86) PCT No.: PCT/KR2012/003402
§ 371 (c)(1),
(2), (4) Date: Dec. 23, 2013

(87) PCT Pub. No.: WO2012/150796
PCT Pub. Date: Nov. 8, 2012

(65) Prior Publication Data
US 2014/0126503 A1    May 8, 2014

Related U.S. Application Data

(60) Provisional application No. 61/501,256, filed on Jun. 27, 2011, provisional application No. 61/481,256, filed on May 2, 2011.

(51) Int. Cl.
*H04W 16/14* (2009.01)
*H04W 72/04* (2009.01)
*H04W 48/16* (2009.01)

(52) U.S. Cl.
CPC ............ *H04W 16/14* (2013.01); *H04W 48/16* (2013.01); *H04W 72/0453* (2013.01)

(58) Field of Classification Search
CPC .. H04W 16/14; H04W 48/16; H04W 72/0453; H04W 72/04
See application file for complete search history.

(56) References Cited

U.S. PATENT DOCUMENTS

2006/0063533 A1    3/2006  Matoba et al.
2010/0195667 A1    8/2010  Wang et al.
(Continued)

FOREIGN PATENT DOCUMENTS

WO    2011/007539 A1    1/2011
WO    2011/049314 A2    4/2011

OTHER PUBLICATIONS

Lavaux et al., "Cognitive radio systems for efficient sharing of TV white spaces in European context," COGEU D3. 2 Initial Architecture for TVWS Spectrum Sharing Systems, Jan. 17, 2011.
(Continued)

*Primary Examiner* — Noel Beharry
*Assistant Examiner* — Ruihua Zhang
(74) *Attorney, Agent, or Firm* — Morgan, Lewis & Bockius LLP

(57) ABSTRACT

According to an embodiment of the present invention, a method of transmitting/receiving a signal of a device using a non-licensed band in a wireless communication system includes: receiving available channel information by a first type device; and determining a first channel for transmitting a signal from the first type device to a second type device, and a second channel for receiving a signal from the second type device, among the available channels.

5 Claims, 15 Drawing Sheets

(56) References Cited

U.S. PATENT DOCUMENTS

| | | | |
|---|---|---|---|
| 2010/0246506 A1* | 9/2010 | Krishnaswamy | ... H04W 72/085 370/329 |
| 2011/0090887 A1 | 4/2011 | Kim et al. | |
| 2011/0222493 A1* | 9/2011 | Mangold | H04B 1/0475 370/329 |
| 2011/0310253 A1* | 12/2011 | Singh | H04W 16/14 348/184 |
| 2012/0135772 A1 | 5/2012 | Demessie et al. | |
| 2012/0184318 A1* | 7/2012 | Lee | H04W 16/14 455/515 |
| 2013/0177007 A1* | 7/2013 | Lee | H04W 84/12 370/338 |
| 2013/0281109 A1* | 10/2013 | Kim | H04W 16/14 455/454 |
| 2014/0321409 A1* | 10/2014 | Kim | H04W 16/14 370/329 |

OTHER PUBLICATIONS

Written Opinion and International Search Report issued in corresponding International Patent Application No. PCT/KR2012/003402 dated Oct. 30, 2012.

* cited by examiner

FIG. 8

| Element ID | Length | Country code | Channel Map |
|---|---|---|---|
| 1 | 1 | 3 | N |

Octet

| | Device Type | Channel Number N | Max. Transmission Power level on Channel N | Channel Number M | Max. Transmission Power level on Channel M | ...... | Channel Number K | Max. Transmission Power level on Channel K | Validity time |
|---|---|---|---|---|---|---|---|---|---|
| Octets: | 1 | 1 | 1 | 1 | 1 | | 1 | 1 | 1 |

(b)

| | Device Type | Channel Number N | Max. Transmission Power level on Channel N | Validity time | ...... | Channel Number K | Max. Transmission Power level on Channel K | Validity time |
|---|---|---|---|---|---|---|---|---|
| Octets: | 1 | 1 | 1 | 8 | | 1 | 1 | 8 |

FIG. 10

|  | Device Type | Starting channel Number (S) | Number of Channels (L) | Channel Bitmap | Validity time |
|---|---|---|---|---|---|
| Octets : | 1 | 1 | 1 | Variable | 8 |

FIG. 11

These four fields are repeated according to the available channels

|  | Device Type | Starting frequency | Stop frequency | Max. allowed Transmission power | Validity time |
|---|---|---|---|---|---|
| Octets : | 1 | 1 | 1 | Variable | 8 |

(a)

These four fields are repeated according to the available channels

|  | Device Type | Starting frequency | Stop frequency | Max. allowed Transmission power | Validity time |
|---|---|---|---|---|---|
| Octets : | 1 | 1 | 1 | Variable | 8 |

These four fields are repeated according to the available channels

|  | Device Type | Center frequency | Channel Bandwidth | Max. allowed Transmission power | Validity time |
|---|---|---|---|---|---|
| Octets : | 1 | 1 | 1 | Variable | 8 |

(a)

These four fields are repeated according to the available channels

|  | Device Type | Center frequency | Channel Bandwidth | Max. allowed Transmission power | Validity time |
|---|---|---|---|---|---|
| Octets : | 1 | 1 | 1 | Variable | 8 |

(b)

FIG. 13
CH 21    CH 22    CH 23    CH 24    CH 25
(a) Vacant TV channels
4W
(b) Available TV channels for fixed device
40mW    100mW    40mW
(c) Available TV channels for personal / potable device

FIG. 14

| Device Type (Fixed Device) | CH 13 | 1 W | CH 18 | 1 W | CH 42 | 1 W |
|---|---|---|---|---|---|---|

(a)

| Device Type (Personal / Portable Device) | CH 41 | 40mW | CH 42 | 100mW | CH 43 | 100mW |
|---|---|---|---|---|---|---|

(b)

| Device Type (Personal / Portable Device) | CH 42 | 40mW |
|---|---|---|

These fields are repeated as determined by Lenth field

| Element ID | Length | Switch Mode | Operating Class | Channel Number | Switch Offset | Switch Duration | Switch Interval | Peer Device Address (Optional) |
|---|---|---|---|---|---|---|---|---|
| 1 | 1 | 1 | 1 | 1 | 1 | 1 | 1 | 6 |

METHOD FOR TRANSMITTING/RECEIVING A SIGNAL IN A WIRELESS COMMUNICATION SYSTEM

TECHNICAL FIELD

The present invention relates to a method and apparatus for transmitting and receiving a signal of a device using an unlicensed band in a wireless communication system.

BACKGROUND ART

Standards for wireless local area network (WLAN) technology have been and continue to be developed by the institute of electrical and electronics engineers (IEEE) as the 802.11 standard. IEEE 802.11a and b use an unlicensed band at 2.4 GHz or 5 GHz, IEEE 802.11b provides a transmission speed of 11 Mbps, and IEEE 802.11a provides a transmission speed of 54 Mbps. IEEE 802.11g applies orthogonal frequency division multiplexing (OFDM) at 2.4 GHz to provide a transmission speed of 54 Mbps. IEEE 802.11n applies multiple input multiple output-OFDM (MIMO-OFDM) to provide a transmission speed of 300 Mbps for four spatial streams. IEEE 802.11n supports a channel bandwidth up to 40 MHz and in this case, provides a transmission speed of 600 Mbps. IEEE 802.11af is a standard defining an operation of an unlicensed device in a TV whitespace (TVWS) band.

TVWS is a frequency band allocated to a broadcast TV, which includes an ultra high frequency (UHF) band and a very high frequency (VHF) band and in which an unlicensed device is allowed to operate so long as such operation does not interfere with that of a licensed device. Examples of a licensed device may include a TV, a wireless microphone, and so on. The licensed device may be called an incumbent user or a primary user. In addition, in order to overcome problems in terms of coexistence between unlicensed devices using the TVWS, a frequency sensing mechanism, a signaling protocol such as a common beacon frame, and so on may be needed.

According to TVWS, operations of all unlicensed devices, except for in certain special cases, are allowed at 512 to 608 MHz and 614 to 698 MHz. However, only communication between fixed devices is allowed in a band of 54 to 60 MHz, 76 to 88 MHz, and 174 to 216 MHz, and 470 to 512 MHz. The fixed device refers to a device for transmitting a signal at a predetermined location only. An IEEE 802.11 TVWS UE refers to an unlicensed device that operates using an IEEE 802.11 media access control (MAC) and a physical layer (PHY) in a TVWS spectrum.

An unlicensed device that desires to use TVWS needs to provide a function of protecting a licensed device. Thus, the unlicensed device should check whether the licensed device occupies a corresponding band prior to transmission of signals in the TVWS.

To this end, the unlicensed device may perform spectrum sensing to check whether the corresponding band is being used by the licensed device. Examples of spectrum sensing mechanism may include an energy detection method, a feature detection method, and so on. When a signal received at a specific channel is greater than or equal to a predetermined value or a DTV preamble is detected, the unlicensed device may determine that the licensed device is using the specific channel. In addition, when the unlicensed device determines that the licensed device is being used in a channel adjacent to a currently used channel, the unlicensed device needs to reduce transmit power thereof.

In addition, the unlicensed device needs to access a DB through the Internet or a leased line to acquire channel list information that is available by the unlicensed device in a corresponding area. The DB stores and manages information regarding licensed devices registered therein and channel usage information that dynamically varies according to geo-location and usage time of corresponding licensed devices.

Through this specification, a whitespace band includes the aforementioned TVWS but is not limited thereto. The term whitespace band as used herein refers to a band in which an operation of a licensed device is preferentially allowed and an operation of an unlicensed device is allowed only when the licensed device is protected. In addition, a whitespace device operates in a whitespace band. For example, a device based on an IEEE 802.11 system is also an example of the whitespace device. In this case, the whitespace device may refer to an unlicensed device that operates using an IEEE 802.11 MAC layer and PHY layer in the whitespace band. That is, a general 802.11 standard-based AP and/or STA operating in the whitespace band may be an example of the unlicensed device.

DISCLOSURE

Technical Problem

An object of the present invention devised to solve the problem lies in a method and apparatus for transmitting and receiving a signal of a device using an unlicensed band in a wireless communication system, in particular, a method of transmitting and receiving a signal between devices via frequency division multiplexing (FDM) in an unlicensed band.

It is to be understood that both the foregoing general description and the following detailed description of the present invention are exemplary and explanatory and are intended to provide further explanation of the invention as claimed.

Technical Solution

A first object of the present invention can be achieved by providing a method for transmitting and receiving a signal of a device using an unlicensed band in a wireless communication system, the method including receiving available channel information by a first type of device, and determining a first channel supposed to transmit a signal to a second type of device by the first type of device and a second channel supposed to receive a signal from the second type of device by the first type of device, from the available channel.

In a second aspect of the present invention, provided herein is a first type of device using an unlicensed band in a wireless communication system, the device including a transceiver, and a processor for controlling the device including the transceiver, wherein the processor receives available channel information, and determines a first channel supposed to transmit a signal to a second type of device by the first type of device and a second channel supposed to receive a signal from the second type of device by the first type of device, from the available channel.

The first and second technical features may include all or some of the following features.

The available channel information may include available channel information corresponding to the first type of device and available channel information corresponding to the second type of device.

The first type of device may broadcast information regarding the second channel.

The first channel may be at least one of available channels corresponding to the first type of device.

The second channel may be at least one of available channels corresponding to the second type of device.

The first type of device may be a fixed device, and the second type of device may be a personal/portable device.

The first type of device may switch an operating band to the second channel in order to receive a signal from the second type of device when the first type and the second type are the same. Here, the first type of device may broadcast information regarding the second channel. In addition, the information regarding the second channel may include at least one of information regarding a channel number of the second channel, operating time duration in the second channel, information regarding time duration up to switch to the second channel, and information regarding an identifier of a device for transmitting a signal received from the second channel. A third type of device receiving information regarding the second channel and unavailable to acquire available channel information from a geo-location information database may stop transmission while the first type of device operates in the second channel. In addition, the first type of device and the second type of device may be devices available to acquire available channel information from a geo-location information database.

The available channel information may be transmitted to a white space map.

Advantageous Effects

According to embodiments of the present invention, an available unlicensed band may be used via frequency division multiplexing (FDM) and thus frequency resources may be effectively used to transmit a signal between devices.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 8 illustrates an example of a whitespace map (WSM) according to an embodiment of the present invention;

FIGS. 9 to 12 are diagrams illustrating examples of a channel map of a WSM according to an embodiment of the present invention;

FIG. 13 is a diagram for explanation of a case in which an available channel depends on a device type;

FIG. 14 is a diagram for explanation of transmission and reception of a signal between devices via frequency division multiplexing (FDM) according to an embodiment of the present invention;

FIG. 16 is a diagram for explanation of an information element according to the embodiment of FIG. 15.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

First, a general structure of a wireless local area network (WLAN) system will be described with reference to FIGS. 1 and 2.

Figure 1:
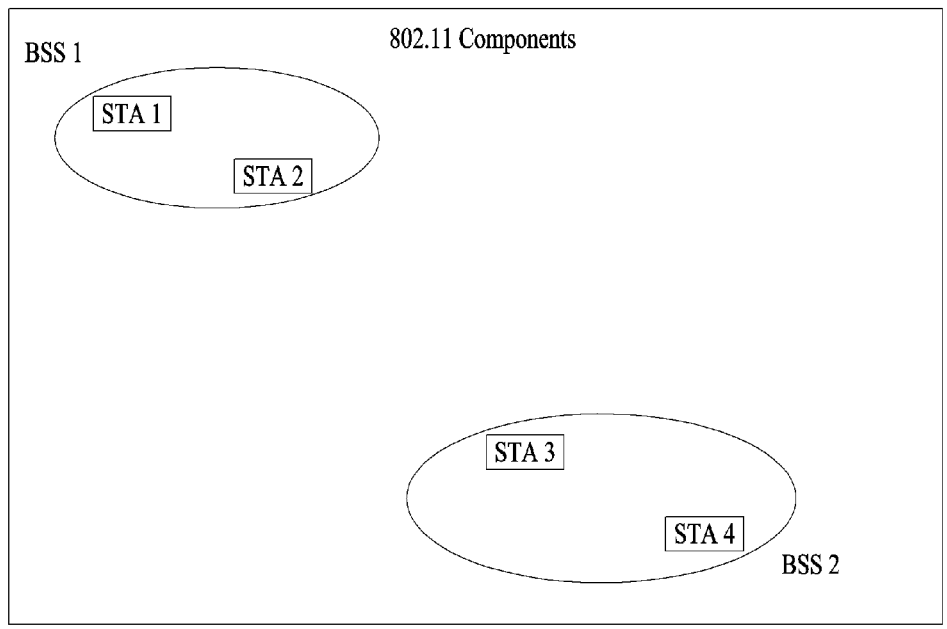
FIG. 1 is a diagram of an example of a structure of a wireless local area network (WLAN) system.

FIG. 1 is a diagram of an example of a structure of a WLAN system.

As illustrated in FIG. 1, the WLAN system includes one or more basic service set (BSS). The BSS is a set of stations (STAs) that succeed in synchronization to communicate with each other.

The STA is a logical object including a medium access control (MAC) layer and a physical layer interface for a wireless medium and includes an access point (AP) and a non-AP station. Among STAs, a portable UE manipulated by a user is a non-AP STA. In this regard, the term STA indicates a non-AP STA. The non-AP STA may also be referred to by other terms such as terminal, wireless transmit/receive unit (WTRU), user equipment (UE), mobile station (MS), mobile terminal, mobile subscriber unit, and so on.

In addition, the AP is a medium that allows an STA associated with the AP to access a distribution system (DS) through a wireless medium. The AP may also be called a convergence controller, a base station (BS), a node-B, a base transceiver system (BTS), a site controller, or the like.

The BSS may be classified into an infrastructure BSS and an independent BSS (IBSS).

The BBS illustrated in FIG. 1 is an IBSS. The IBSS refers to a BSS that does not include an AP. Since the IBSS does not include an AP, the IBSS does not allow access to a DS and thus constitutes a self-contained network.

Figure 2:
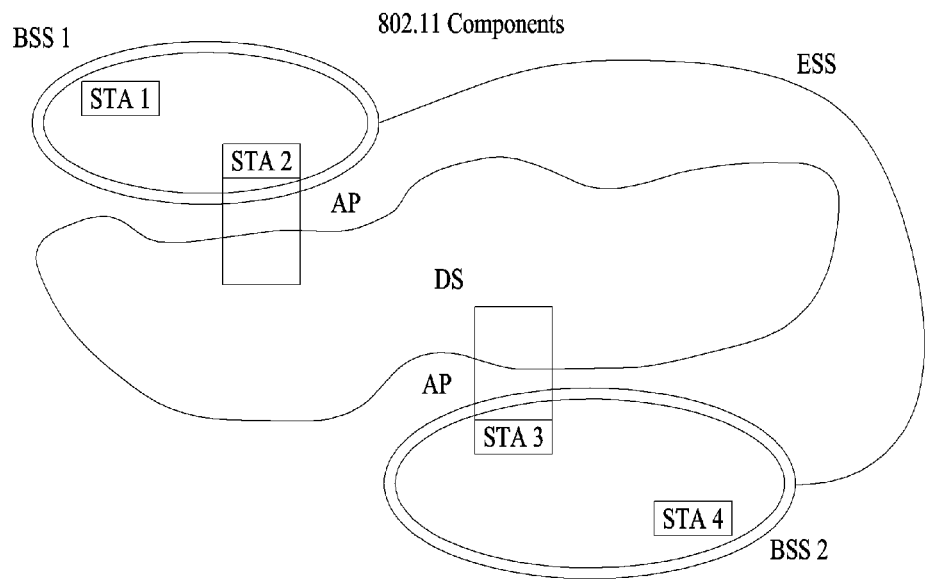
FIG. 2 is a diagram of another example of a structure of a WLAN system.

FIG. 2 is a diagram of another example of a structure of a WLAN system.

A BSS illustrated in FIG. 2 is an infrastructure BSS. The infrastructure BSS includes one or more STAs and APs. In the infrastructure BSS, non-AP STAs communicate with each other through the APs in principle. However, when a direct link is established between non-AP STAs, direct communication between non-AP STAs is possible.

As illustrated in FIG. 2, a plurality of infrastructure BSSs may be connected to each other through a DS. A plurality of BSSs connected through the DS is referred to as an extended service set (ESS). STAs included in the ESS may communicate with each other. A non-AP STA may move from one BSS to another BSS while communicating in the same ESS without intermission.

The DS is a mechanism for connection among a plurality of APs, is not always a network, and is not limited to a particular form as long as the DS provides a predetermined distributed service. For example, the DS may be a wireless network such as a mesh network or a physical structure for connecting APs to each other.

A spectrum that is not used by a licensed device may be referred to as a whitespace and used by an unlicensed device. For an operation of an STA in a whitespace spectrum, a protection scheme for an incumbent user needs to be preferentially provided. In order to protect the licensed device, the STA or the AP needs to use only a channel that is not used by the incumbent user. A channel that is not used by the unlicensed device and can be used by the unlicensed device is referred to as an available channel. Examples of a basic method of determining availability of a TV channel by the STA or the AP include spectrum sensing and a method of accessing a DB to acquire information of a TV channel schedule. Information of the DB includes information regarding a usage schedule of a specific channel of the unlicensed device at a specific location. Thus, an STA or AP that desires to check whether a TV channel is available needs to access the DB through the Internet to acquire DB information based on location information of the STA or the AP.

In order to access a network, the STA needs to search for an accessible network. The STA needs to identify a compatible network prior to participation in a wireless network. In this regard, a process of identifying a network present in a specific region is referred to as scanning. Scanning includes active scanning and passive scanning.

Figure 3:
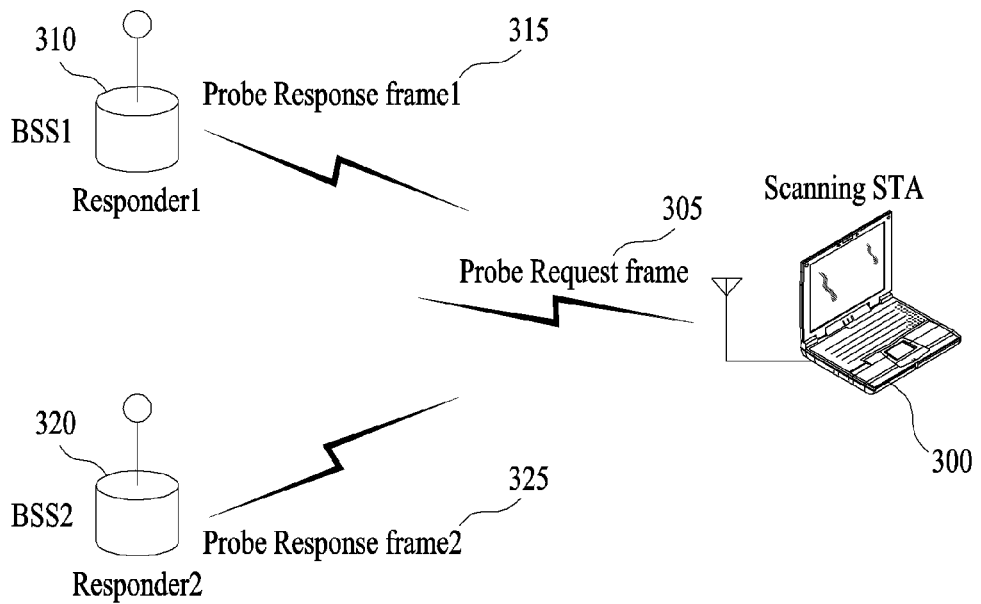
FIG. 3 is a schematic diagram of active scanning.

FIG. 3 is a schematic diagram of active scanning.

In the active scanning, an STA that performs the scanning transmits a probe request frame and awaits a response thereto in order to investigate APs present therearound while moving across channels. A responder transmits a probe response frame in response to the probe request frame to the STA that transmits the probe request frame. Here, the responder is an STA that lastly transmits a beacon frame in a BSS of a channel that is being scanned. In an infrastructure BSS, an AP transmits a beacon frame and thus the AP is a responder. In an IBSS, STAs in the IBSS alternately transmit a beacon frame and thus a responder is not fixed.

Referring to FIG. 3, when a scanning STA 300 transmits a probe request frame 305, a responder 1 310 of a BSS1 and a responder 2 320 of a BSS2, which receive a probe request frame, transmit a probe response frame 1 315 and a probe response frame 2 325 to the scanning STA 300, respectively. The scanning STA 300 that receives a probe response frame stores BSS related information included in the received probe response frame, moves to the next channel, and performs scanning using the same method in the next channel.

Figure 4:
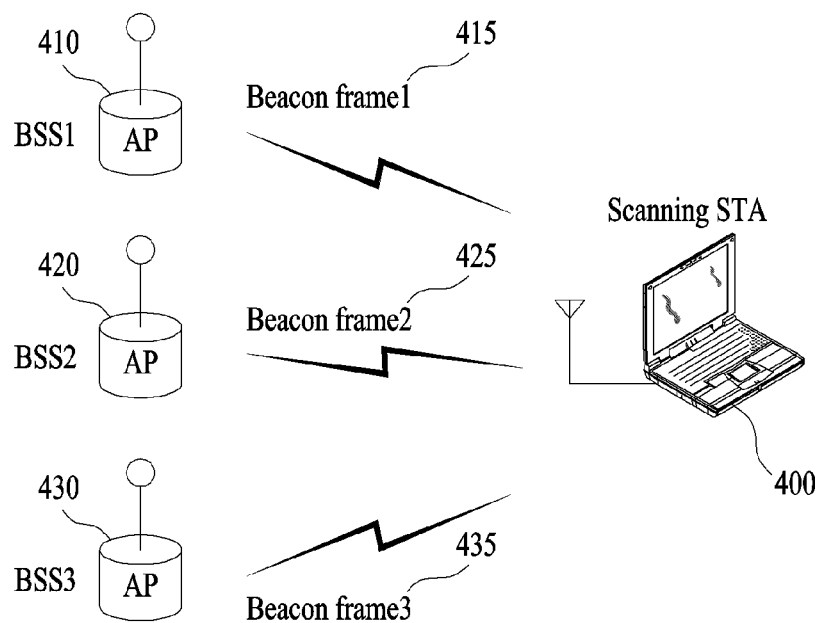
FIG. 4 is a schematic diagram of passive scanning.

FIG. 4 is a schematic diagram of passive scanning.

In the passive scanning, an STA that performs the scanning awaits a beacon frame while moving across channels. The beacon frame is a management frame in the IEEE 802.11 and is periodically transmitted so as to indicate existence of a wireless network and to allow the STA that performs the scanning to search for a wireless network and to participate in the wireless network. In an infrastructure BSS, an AP periodically transmits a beacon frame.

When the STA that performs the scanning receives a beacon frame, the STA stores information regarding a BSS included in the beacon frame and records beacon frame information at each channel while moving to another channel.

In FIG. 4, when a scanning STA 400 that performs channel scanning using a passive scanning method in a specific channel receives a beacon frame 1 415 transmitted from an AP1 410 of a BSS1 and a beacon frame 2 425 transmitted from an AP2 420 of a BSS2 and does not receive a beacon frame 3 435 transmitted from an AP3 430 of a BSS3, the scanning STA 400 stores discovery of two BSSs, BSS1 and BSS2, in a measurement channel and moves to another channel.

Comparing active scanning and passive scanning, the active scanning is more advantageous than the passive scanning in terms of low delay and power consumption.

Hereinafter, a process of enabling an STA to operate in a whitespace band will be described.

An unlicensed device that operates in a whitespace band may be classified into an enabling STA and a dependent STA. The enabling STA can enable the dependent STA, can transmit a signal without reception of an enabling signal, and initiate a network.

The enabling STA may provide geo-location information to a DB and acquire available channel information that can be used at a corresponding geo-location from the DB. The enabling STA is not always a WLAN STA and may be a logical object or a network server that can provide services related to enablement.

The dependent STA is an STA that can transmit a signal only upon receiving an enabling signal and is controlled by the enabling STA. The dependent STA needs to be enabled through the enabling STA and cannot be independently enabled.

Figure 5:
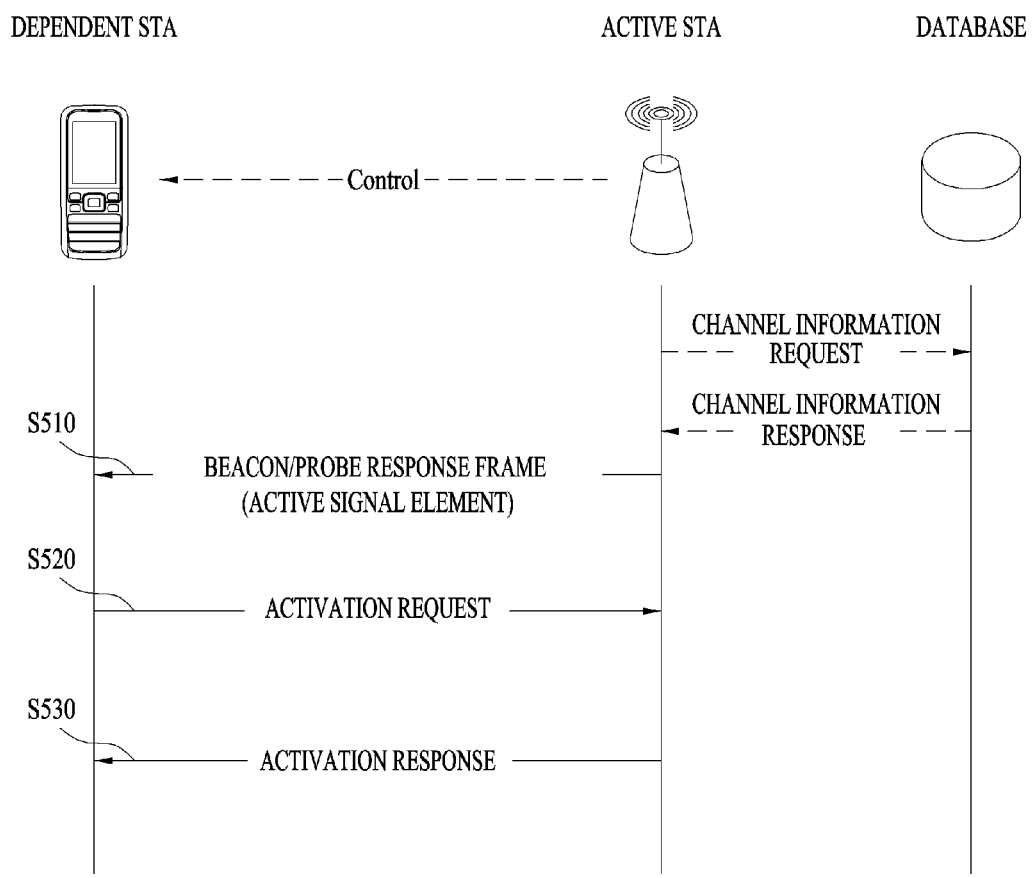
FIG. 5 is a diagram of an example of an enablement process of a station (STA)

FIG. 5 is a diagram of an example of an enablement process of an STA.

IEEE 802.11y is a standard formed for an operation of an unlicensed device in a band of 3.5 GHz and describes an enablement process that is referred to as dynamic STA enablement (DSE). A process of enabling the dependent STA by the enabling STA may be performed in a similar way to the DSE of IEEE 802.11y. In reality, an enablement process applied to a whitespace is not always the same as the DSE. However, basically, the enablement process is the same as the DSE in that the dependent STA can transmit a signal to a corresponding band/channel only after receiving an enabling signal.

As illustrated in FIG. 5, the enabling STA may transmit a probe response frame and beacon including the enabling signal to the dependent STA (S510). A signal indicating that enabling is possible is referred to as an enabling signal. In this regard, in an example illustrated in FIG. 5, the probe response frame or beacon including an enabling signal element corresponds to the enabling signal. The dependent STA that receives and decodes the enabling signal transmits an enablement request frame to the enabling STA using a channel used to receive a corresponding signal (S520) and receives an enablement response frame from the enabling STA (S530).

In order to allow an unlicensed device instead of an incumbent user to operate in a whitespace, the corresponding unlicensed device may acquire a channel that does not interfere with an incumbent user at a specific location, that is, available channel information and may operate according to the available channel information for protection of the incumbent user. The available channel information may include an available channel list that is a set of one or more available channels.

As described above, available channel information acquired by an enabling STA from a DB and/or available channel information (or an available channel list) acquired by a dependent STA from the enabling STA may be provided in the form of a whitespace map (WSM). As illustrated in FIG. 5, the available channel list (or WSM) may be transmitted between STAs or provided through channel availability query (CAQ) request/response, etc.

Figure 6:
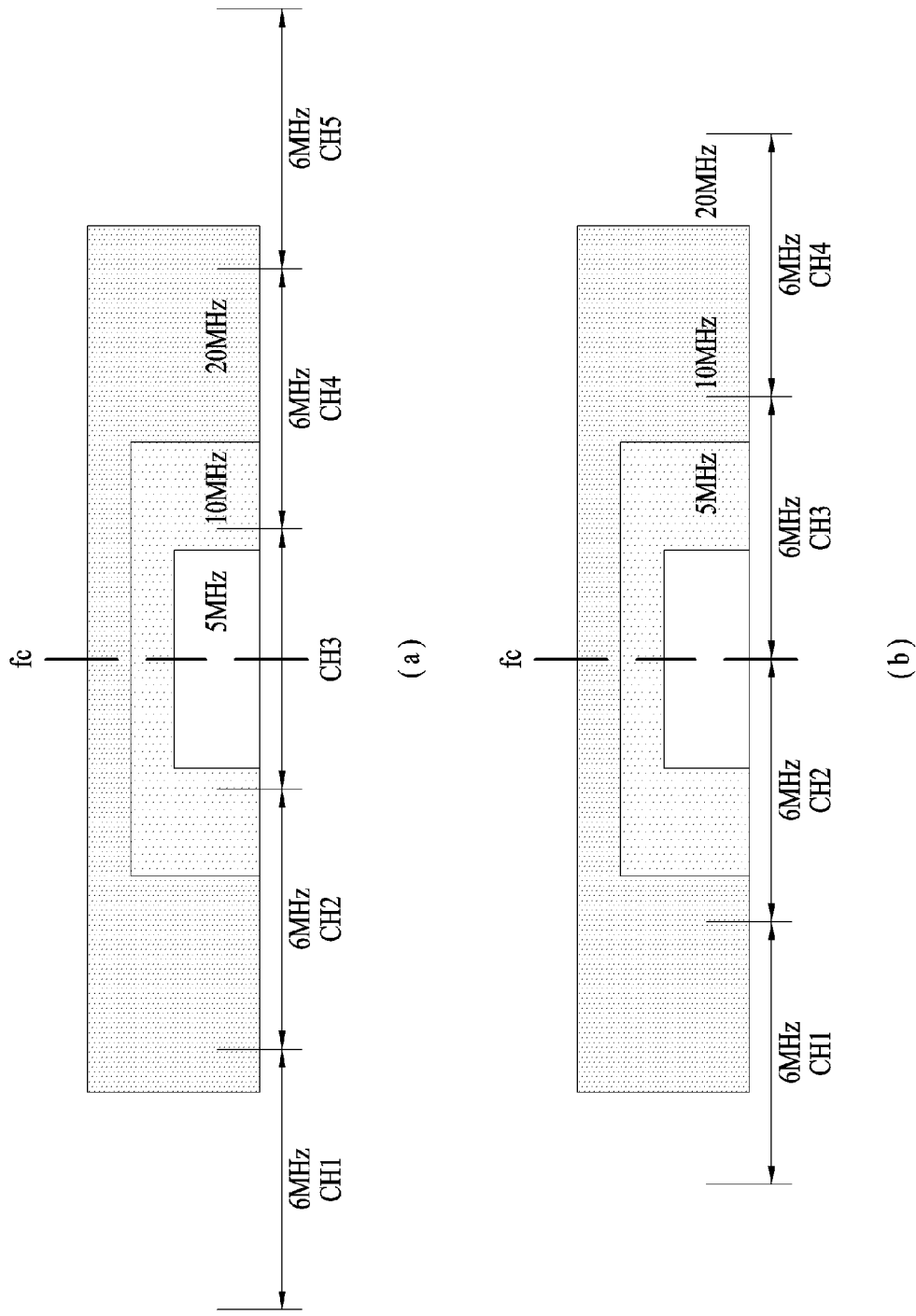
FIG. 6 is a diagram of an example in which a WLAN channel is allocated in a frequency band corresponding to the aforementioned available channel information.

FIG. 6 is a diagram of an example in which a WLAN channel is allocated in a frequency band corresponding to the aforementioned available channel information. In detail, FIG. 6(A) illustrates an example in which the available channel information is from channel #1 CH1 to channel #5 CH5. FIG. 6(B) illustrates an example in which the available channel information is from channel #1 CH1 to channel #4 CH4. As seen from FIG. 6(A), a WLAN channel having bandwidths of 5 MHz, 10 MHz, and 20 MHz can be allocated using a center of channel #3 CH3 as a center frequency. As seen from FIG. 6(B), a WLAN channel having bandwidths of 5 MHz, 10 MHz, and 20 MHz can be allocated using a boundary of channel #2 CH2 and channel #3 CH3 as a center frequency.

In FIG. 6(B), even if the number of available channels is reduced compared with FIG. 6(A), if the center frequency of the WLAN channel of FIG. 6(A) is maintained, a WLAN channel of 20 MHz cannot be used and a WLAN channel of 10 MHz can be used due to a relationship with an adjacent channel by reducing maximum transmit power only. Here, the adjacent channel refers to a channel that adjoins the corresponding channel in opposite directions thereof (high and low frequency directions). When an incumbent user is not present in an adjacent channel to a channel used by the unlicensed device, a maximum transmit power level of the unlicensed device is approximately 100 mW. However, when the incumbent user is present in the adjacent channel, the maximum transmit power level of the unlicensed device may be limited to 40 mW (which is determined in consideration of federal communications commission (FCC) regulations regarding an adjacent channel. The FCC formulates regulations for communication in a whitespace band to ensure network stability, security, etc. An operation of a device that does not satisfy the FCC regulations needs to be prevented in the whitespace band. When a signal of an incumbent user is detected in a channel directly adjacent to a channel that is currently used by the unlicensed device, the unlicensed device needs to reduce transmit power thereof in the corresponding currently used channel).

Figure 7:
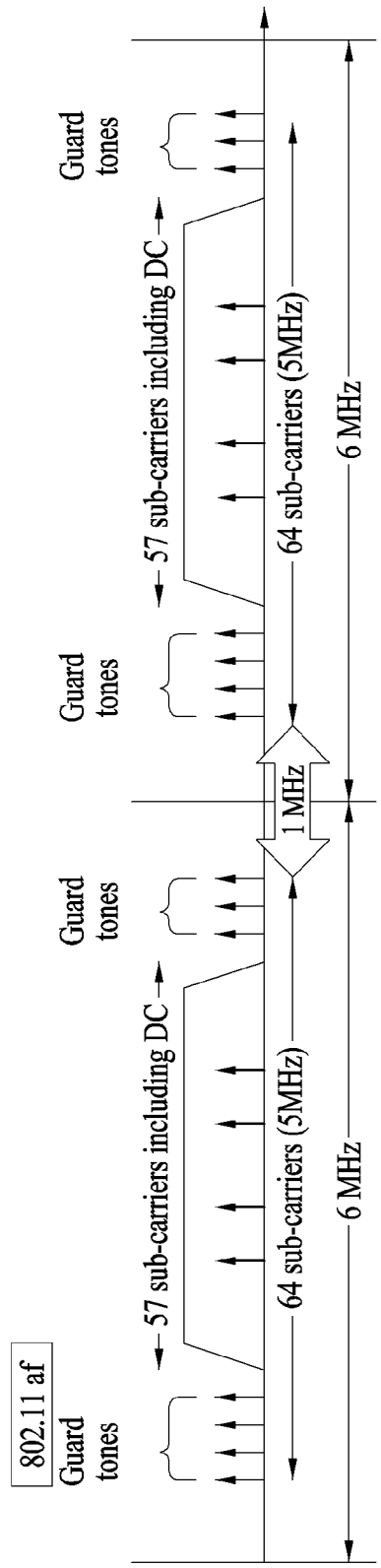
FIG. 7 is a diagram illustrating channel bonding.

As illustrated in FIG. 6, when the WLAN channel is allocated in a frequency band corresponding to the available channel information, channel bonding may be used. That is, in FIG. 6, a WLAN channel having a bandwidth of 10 MHz that is allocated in the frequency band corresponding to the available channel information is contiguously allocated in a frequency band corresponding to the channel #2 CH 2 and the channel #3 CH3. However, as illustrated in FIG. 7, a WLAN channel having a bandwidth of 10 MHz can be used by non-contiguously allocating the WLAN channel in the frequency band and using channel bonding.

White Space Map (WSM)

A WSM is obtained by forming information regarding channels available by an unlicensed device in a TVWS band based on channel and frequency information acquired by the STA from the DB, in a map form. The WSM includes an available channel list or frequencies available by the unlicensed device. Channels included in the available channel list or frequencies are channels that are not used by signals to be legally protected and can be used by the unlicensed device at a point of time when the unlicensed device accesses the DB. In addition, when the unlicensed device requests the DB for an available channel after a specific period of time from the time when the unlicensed device accesses the DB, the WSM may include information regarding available channels and frequencies from a corresponding point of time. In addition, when the unlicensed device requests the database for an available channel, a channel that can be used by the unlicensed device may be signaled to transmit the information regarding the available channel and frequency.

A channel of an available channel may have granularity of a smallest basic unit provided from a DB. That is, when the smallest basic unit constituting an available channel list provided by a database of a TVWS band is a TV channel, the available channel list may be a TV channel list that can be used by an unlicensed device. For example, the TV channel list of America and Korea is a list containing TV channel numbers in units of 6 MHz and the TV channel list of other countries is a list having the TV channel numbers in a unit of 7 MHz or 8 MHz. According to a specific country and rule, a channel of an available channel list may be a TV channel or may correspond to a different type of information for signaling information regarding, for example, a frequency band.

Hereinafter, various WSM formats will be described with regard to an embodiment of the present invention.

FIG. 8 illustrates an example of a WSM. Referring to FIG. 8, a "country code" field provides information on the location of a channel map following this field. That is, countries may have different TV band ranges and TV channel bandwidths. Accordingly, the country code field helps recognize the physical location of a TV channel available for an STA that receives the WSM along with a channel map field. The country code field can include country code information of 3 octets. In detail, the first 2 octets indicate a country code defined in ISO/IEC 3166-1 and the last octet means an environment. However, the country code field is not limited thereto and can include more detailed information than country code information. For example, the country code field can include a regional code value of a specific country.

The channel map field indicates available channel information. The basic unit of the channel map field does not have to be a TV channel bandwidth but may be channel information in a smallest basic unit provided by a DB according to a corresponding rule. In America, the channel map field may include a maximum transmission power value corresponding to each available TV channel according to an available TV channel number and rule, which is illustrated in FIG. 9. That is, as illustrated in FIG. 9(A), the channel map field may include an available TV channel number (Channel Number N field) and maximum transmit power information in a frequency band corresponding to the available TV channel number (Max. Transmission Power level on Channel N field). As illustrated in FIG. 9(B), the channel map field may include, as one set of available TV channels, information regarding time in which the available TV channel number is valid as well as an available TV channel number (Channel Number N field) and maximum transmit power information in a frequency band corresponding to the available TV channel number (Max. Transmission Power level on Channel N field).

Referring to FIG. 10 as another example of the channel map field, an available TV channel number and maximum transmit power information therein may be transmitted through the channel bitmap field configured as a bitmap. Alternatively, the bitmap may be configured in such a manner that an available channel number of an entire channel list is indicated by 1 and unavailable channel number of the channel list is indicated by 0. In detail, TV channels available for transmission between TVWS 802.11 AP and STA have a bandwidth of 6 MHz in the US and correspond to channels #21 to #51. That is, it is necessary to indicate whether primary users are present in 30 TV channels. A bitmap for TV channels #21 to #51 can be configured in ascending order or descending order in such a manner that a channel in which a primary user is present is indicated by 0 (unavailable) and a channel in which a primary user is not present is indicated by 1 (available) or vice versa.

A field 'starting channel number (S)' represents the number of a TV channel from which a bitmap is started. A field "number of channels (L)" represents the number of channels starting from the starting channel number in the bitmap indicated in the channel map. The length of the channel bitmap following the "number of channels (L)" field depends on the value of the "number of channels" field.

FIG. 11 illustrates another example of a channel map field. FIG. 11 illustrates an example in which an available channel is indicated by a frequency band instead of a TV channel number. The start frequency field indicates start of an available frequency band in a TVWS band, the stop frequency field indicates stop of a frequency band thereof, and available transmission power in a corresponding period may be signaled. Since there is a high possibility that available frequency bands are discontinuous according to characteristics of TVWS bands, a tuple of three fields such as start frequency, stop frequency, and max. allowed transmission power fields can be repeated in order to represent the available frequency bands, as illustrated in FIG. 11(A). Alternatively, the tuple including a validity time field may be repeated, as illustrated in FIG. 11(B).

FIG. 12 illustrates an example of a channel map field indicating an available channel using a center frequency. A center frequency field indicates a center frequency of a frequency band corresponding to an available channel in a TVWS, a channel bandwidth field indicates bandwidth information of the frequency band, and a max. allowed transmission field indicates maximum transmit power. As illustrated in FIG. 12(A), the three fields may transmit a plurality of discontinuous frequency band information by forming and repeating a tuple. Alternatively, the tuple including a validity time field may be repeated, as illustrated in FIG. 12(B).

In the channel map field described with reference to FIGS. 8 to 12, the device type field indicates whether the corresponding available channel information corresponds to a TV channel region assigned to a personal/portable device or to a TV channel region assigned to a fixed device. The device type will be described in greater detail. With regard to an example of FIG. 10, use of the device type field may be determined as follows. If the device type is 0, a channel bitmap field (bits 1 to 30) may be bitmap information of TV channels #21 to #51. It may be necessary to indicate whether a channel and a frequency are available in bands of 54 to 60 MHz, 76 to 88 MHz, 174 to 216 MHz and 470 to 512 MHz which are assigned for communication between fixed devices when an STA that receives the channel map is a fixed device or as occasion demands. For this, when the device type is 1, bits 1 to 18 may be recognized as bitmap information.

That is, channel map information depends upon device type. A fixed device and a personal/portable device that receive WSM information need to identify channel maps assigned thereto. Accordingly, a fixed device in a master mode indicates whether a channel map is for a fixed device or a personal/portable device through a device type when transmitting the channel map.

FIG. 13 is a diagram for explanation of available channel variation depending upon device type. As illustrated in FIG. 13(A), when TV channels #21 and #25 are occupied by an incumbent user, a fixed device can operate at a maximum power of 4 W in TV channel #23 except for adjacent channels #22 and #24 (CH22 and CH24) occupied by the incumbent user, as illustrated in FIG. 13(B). As illustrated in FIG. 13(C), a personal/portable device can operate at a maximum power of 40 mW in the adjacent channels #22 and #24 (CH22 and CH24) and at a maximum power or 100 mW in TV channel #23 (CH23). That is, although channels that are not occupied by the incumbent user are the same due to a relationship with adjacent channels, available channel information may vary according to device type.

WSM Device Type

Current FCC regulations regarding TVWS largely define two device types. In detail, devices can be broadly divided into personal/portable devices (P/P devices) that have a small output and can be carried by a user, and fixed devices that have a large output and operate at a fixed location. Different operation regulations are applied to the two device types during operation in the TVWS.

The fixed device transmits/receives a signal at a specific fixed location. Needless to say, the fixed device also needs to access a DB to acquire available channel information in order to transmit a signal at the corresponding location. The fixed device may include a device installed therein for location check, such as a global positioning system (GPS). Alternatively, an installer may input a location directly to the fixed device and the location information may be transmitted to the DB. Needless to say, when the installer inputs the location directly to the fixed device, it is assumed that the location is not changed after the location is input once, and when the location is changed, the changed location needs to be change-registered. The fixed device may serve the same type of fixed device or a P/P device. When the fixed device retrieves available channel information from the DB, the fixed device needs to notify the DB of a device type of the fixed device and to retrieve the available channel information that can be used directly by the fixed device. Simultaneously, in order to serve the P/P device, the fixed device needs to additionally retrieve available channel information that can be used by the P/P device. The fixed device and the P/P device can use different channel periods and have different requirements for maximum allowable transmission power and adjacent channels during an operation, and thus, have different available channel lists according to device type. For example, the fixed device allows signal transmission in a frequency band of 512 to 608 MHz and 614 to 698 MHz as well as a frequency band of 54 to 60 MHz, 76 to 88

MHz, 174 to 216 MHz, and 470 to 512 MHz. However, the P/P device does not allow signal transmission in a TVWS of other frequency bands except for a frequency band of 512 to 608 MHz and 614 to 698 MHz. The fixed device may transmit a signal at higher power than the P/P device. The fixed device allows transmission power as effective isotropic radiated power (EIRP) of a maximum of 4 watts.

The P/P device can transmit/receive a signal at a non-specific location that can be changed. In most cases, the P/P device can be carried by a user and the mobility of the device cannot be predicted. An available frequency band is a frequency period of 512 to 608 MHz and 614 to 698 MHz and maximum transmission power is EIRP of 100 mW. The P/P device may be divided into a mode I device and a mode II device according to whether the device has identification capability for a location of the device, that is, geo-location capability and capability for access to a geo-location DB. In other words, the mode II device may access the geo-location DB, acquire available channel information at the location of the device, and then, operate in a TVWS at the corresponding location. In addition, the mode II device may acquire the available channel information from the DB and transmit a signal for communication initiation to the mode I device to begin communication. However, the mode I device does not require capabilities for access to the geo-location DB. Thus, the mode I device needs to be controlled by the mode II device or the fixed device. The fixed device may access a DB at a fixed location, acquire available channel information, and operate. In this regard, the fixed device may provide a service to the P/P device. The P/P device may serve a P/P device or a fixed device. In this case, the P/P device also needs to acquire available channel information corresponding to the fixed device from the DB and to transmit the information to the fixed device.

A TVWS DB calculates and transmits available channel information according to each device type at a location requested by an unlicensed device in consideration of an incumbent user such as a DTV, a microphone, etc. Factors to be considered when the DB calculates the available channel information may include a device type, a target geo-location, transmission power, a spectrum mask, and so on. In the FCC regulations, whether an adjacent channel can be used is determined according to device type. For example, when a DTV is used on channel #30, even if channels #29 and #31 are vacant, the fixed device cannot use channels #29 and #31 but the P/P device can use the two channels.

When unlicensed devices intend to operate in a TVWS band, there is a need for coexistence of the fixed device with a large output and the P/P device with a small output in a band that can be used by both the fixed device with large power and the P/P with small power, except for a band that can be used by only the fixed device with a large output. This is because, when the fixed device with a large output transmits a signal at a maximum of 4 watts, signals of surrounding P/P devices with a small output cannot help being seriously interfered.

The fixed device can serve the P/P device as well as a fixed device. In addition, the P/P mode II device may also serve a fixed device. In this case, in order to serve the P/P device, basically, the fixed device needs to retrieve available channel and frequency information that can be used by the fixed device, from the DB, and also needs to retrieve available channel and frequency information that can be used by the P/P device, from the DB or a proxy server connected to the DB.

In consideration of this, available channel and frequency information indicate a channel and frequency band in which a corresponding device can perform transmission. In reality, the fixed device can also transmit a signal in a VHF band that is a very low frequency band. The P/P device cannot use some VHF bands in order to restrict a possibility of affecting existing equipment due to the mobility of the device.

In addition, a DTV signal at power of several hundreds to several thousands of miliwatts is transmitted in the corresponding TVWS band. In this regard, when a DTV does not use a specific TV channel, although an unlicensed device can use the corresponding channel, $3^{rd}$ order harmonics of DTV signals in adjacent channels is inter-modulated to act as interference in the channel that is used by the unlicensed device in an unlicensed band. This interference needs to be removed by a filter at a receiver. In this case, a cost of equipment using an unlicensed band may be largely increased.

Thus, the present invention proposes a frequency divisional duplex (FDD) scheme for separating transmission and reception in a WLAN in a TVWS band in order to effectively use frequency resources and alleviate interference during transmission and reception.

Embodiment 1

A first embodiment of the present invention relates to a method of transmitting and receiving a signal between a fixed device of a first type and a P/P device of a second type via an FDD scheme. In detail, the fixed device may be considered a fixed AP or P/P and the P/P device may be considered a STA served by the fixed AP. Since different types of devices constitute a network and require different WSMs according to device type, each device needs to have at least two types of available channel and frequency information. Thus, the fixed device needs to receive available channel information corresponding thereto at its location and available channel information at a corresponding location for the P/P device, from the DB. Then, the fixed device may transmit the available channel information to the P/P device that accesses the fixed device.

Hereinafter, it may be assumed that the fixed device mainly transmits a signal in a VHF band and mainly receives a signal in a UHF band, and that the P/P device mainly transmits a signal from the fixed device receives a signal from the fixed device in a VHF band and mainly transmits a signal in a UHF band. One advantage of this method is using a fixed duplexer corresponding to each of the VHF and UHF bands. An STA corresponding to an end-user, that is, a UE does not have to be concerned with strong interference signals that enter co-channels or adjacent channels in the vicinity of the corresponding UE. This is because, although these interference signals are transmitted in a UHF band, a signal to be received by the corresponding UE from the AP is transmitted in a VHF band. Thus, a fixed duplexer filer can sufficiently alleviate interference signals in a UHF band, and thus, a tunable duplexer for filtering interference signals between UEs is unnecessary. In addition, cell-planning may be possible in a WLAN system in a TVWS. When cell-planning is configured in such a way that all fixed APs transmit a signal in a VHF band and all STAs transmit a signal in a UHF band, the fixed APs are sufficiently spaced apart from each other and STAs communicating with a specific AP are close to the corresponding AP. Thus, a need for consideration of interference between APs or interference between STAs may be largely reduced.

Hereinafter, a method of transmitting and receiving a signal between a fixed device and a P/P device will be described in detail with reference to FIG. 14. Referring to FIG. 14, FIG. 14(A) illustrates an example of a WSM for a fixed device and FIGS. 14(B) and 14(C) illustrate examples of a WSM for a P/P device. FIG. 14 illustrates a case in which a WSM includes a set of an available channel and transmission power information in the channel, but the present invention is not limited thereto. That is, the aforementioned various examples of WSMs or WSMs that can be derived therefrom can be used.

First, with reference to FIGS. 14(A) and 14(b), a WSM for a fixed device indicates that the fixed device can transmit a signal at power of 1 watt on channels #13, #18, and/or #42, and a WSM for a P/P device indicates that the P/P device can transmit a signal at power of 40 mW on channel #41 and transmit a signal at power of 100 mW on channels #42 and/or #43. In this case, at least one of available channels #13 and #18 for the fixed device only and channel #42 common to the fixed device and the P/P device may be determined as a channel (a DL channel) for transmission of a signal to the P/P device from the fixed device. Simultaneously, at least one of channels #41 and #43 for the P/P device only and channel #42 common to the fixed device and the P/P device may be determined as a channel (a UL channel) for transmission of a signal to the fixed device from the P/P device. Here, the DL channel or the UL channel may be determined as any one (e.g., channel #41 in case of UL) of channels of the available channel information. Alternatively, the DL channel or the UL channel may be determined as two channels. In this case, two channels may be bonded to use a wider bandwidth.

With reference to FIGS. 14(A) and 14(C), an available channel of the P/P device is channel #42 only. In this case, channel #42 of available channels of the fixed device may be determined as a transmission and reception channel (a UL and DL channel) with the P/P device and channels #13 and #18 may be determined as a channel (a DL channel) for transmission of a signal to the P/P device. That is, a DL channel may be a super set of a UL channel. In other words, the UL channel may be channel #42 and the DL channels may be channels #13, #18, and #42 as a super set of the UL channel.

In the aforementioned example, a channel for bi-directional communication between the fixed device and the P/P device is channel #42 only. Thus, in case of WLAN communication using time divisional duplex (TDD), although a channel for communication between the fixed device and the P/P device is very restrictive (channel #42 in the aforementioned example), when the FDD scheme is used according to an embodiment of the present invention, channel and frequency resources for communication between the two devices may become abundant, resulting in effective resource use.

Hereinafter, scanning when the aforementioned FDD scheme is used will be described.

An AP may transmit signals according to available channel information. An STA that intends to receive a signal from the AP may scan the AP based on the available channel information of the AP. In this case, the scanning may be passive scanning because it is likely that an available channel of the AP and an available channel of the STA are not the same.

The STA may transmit a signal on a channel that is allowed by the available channel information of the STA. The STA may perform active scanning such as transmission of a probe request frame on an available channel of the STA, received by the STA. In this case, a probe response frame of the AP that receives the probe request frame needs to be transmitted to a channel that can be transmitted from the AP in reality, not a channel for reception of the probe request frame. Thus, a beacon frame transmitted from the AP needs to indicate a channel on which the AP receives the probe request frame. Here, a DL channel for transmission of the beacon frame needs to be selected among available channels of the AP and a UL channel for transmission of a signal from STAs to the AP needs to be selected from available channels that can be used by the STA.

The AP may broadcast available channel information of the STA at a location of the AP while selecting a channel based on available channel information of the AP and transmitting a DL signal such that the STA that receives the signal from the AP may select a specific channel based on the available channel information and transmit a random access signal such as a probe request frame. That is, although available channel information corresponding to a device type of the AP does not have to be broadcast, available channel information corresponding to another device type as a service target of the AP needs to be broadcast so as to perform communication between different types of devices. In this case, the transmitted available channel information may be some channel information selected by the AP or WLAN channel information reconfigured by the AP among available channel information corresponding to the STA, for a WLAN channel operation.

In other words, the AP selects a DL channel based on available channel information indicated by a WSM corresponding to a device type of the AP and selects a UL channel for reception of a signal from the STA based on a WSM corresponding to a device type of the STA as a service target. Similarly, the STA may scan APs based on the WSM corresponding to a device type of the AP, recognize a DL of the AP, receive a DL signal from the AP, and transmit a UL signal in a WSM corresponding to a device type of the STA. Here, a channel for transmission of a UL signal may be selected by the AP.

In the aforementioned method, the STA may scan the AP and the AP may also scan the STA. In detail, when the AP transmits a DL signal, the AP informs the STA of a location of a UL channel of the AP. Similarly, when the STA transmits a UL signal of the STA, the STA needs to indicate a location of a DL channel for reception of the STA, that is, a channel for reception of a signal of the AP, from a probe request frame, etc. during transmission of a UL signal of the STA, specifically, an initial setup procedure. Accordingly, the AP may add DL and UL channel information that is actually used by the AP in a corresponding BSS, to a probe response frame while transmitting the probe response channel to the corresponding channel.

Embodiment 2

A second embodiment of the present invention relates to a peer-to-peer (P2P) communication method between fixed devices or mode II devices, which corresponds to a case when the first type and the second type are the same and an FDD scheme in a TVWS is used as in the first embodiment of the present invention.

The fixed device or the mode II device may acquire available channel information from a geo-location DB at a current location of the fixed device. According to the available channel information, for example, when available channel information of a device A indicates channels #20, #21, and #22, and available channel information of a device B indicates channels #22, #23, and #24, an available channel common to the devices A and B is channel #22. For P2P communication between the two devices, the devices may operate on channel #22. To this end, a negotiation procedure for an operating channel between the devices is required.

When available channels of the device B are channels #23, #24, and #25, there is no available channel common to the devices A and B. In this case, for P2P communication between the two devices, negotiation for operating channels used by the two respective devices is required. In detail, the device B cannot transmit a signal to the device A through operating channels #20, #21, and #22 that are used by the device A. However, the device B is on standby in a reception mode in an operating channel (for example, channel #21), the device A may transmit a signal to the device B in an operating channel of the device A. Similarly, the device A cannot transmit a signal to the device B in an operating channel (at least one of channels #22, #23, and #24) used by the device B. However, when the device A is on standby in a reception mode in an operating channel of the device B, the device B may transmit a signal to the device A in an operating channel of the device B.

Likewise, an FDD scheme of a case when there is no available channel common to the devices A and B will be described in more detail with reference to FIG. 15. Hereinafter, for convenience of description, the 'fixed device A or mode II device A' will be referred to as the 'device A' and the 'fixed device B or mode II device B' will be referred to as the 'device B'.

Figure 15:
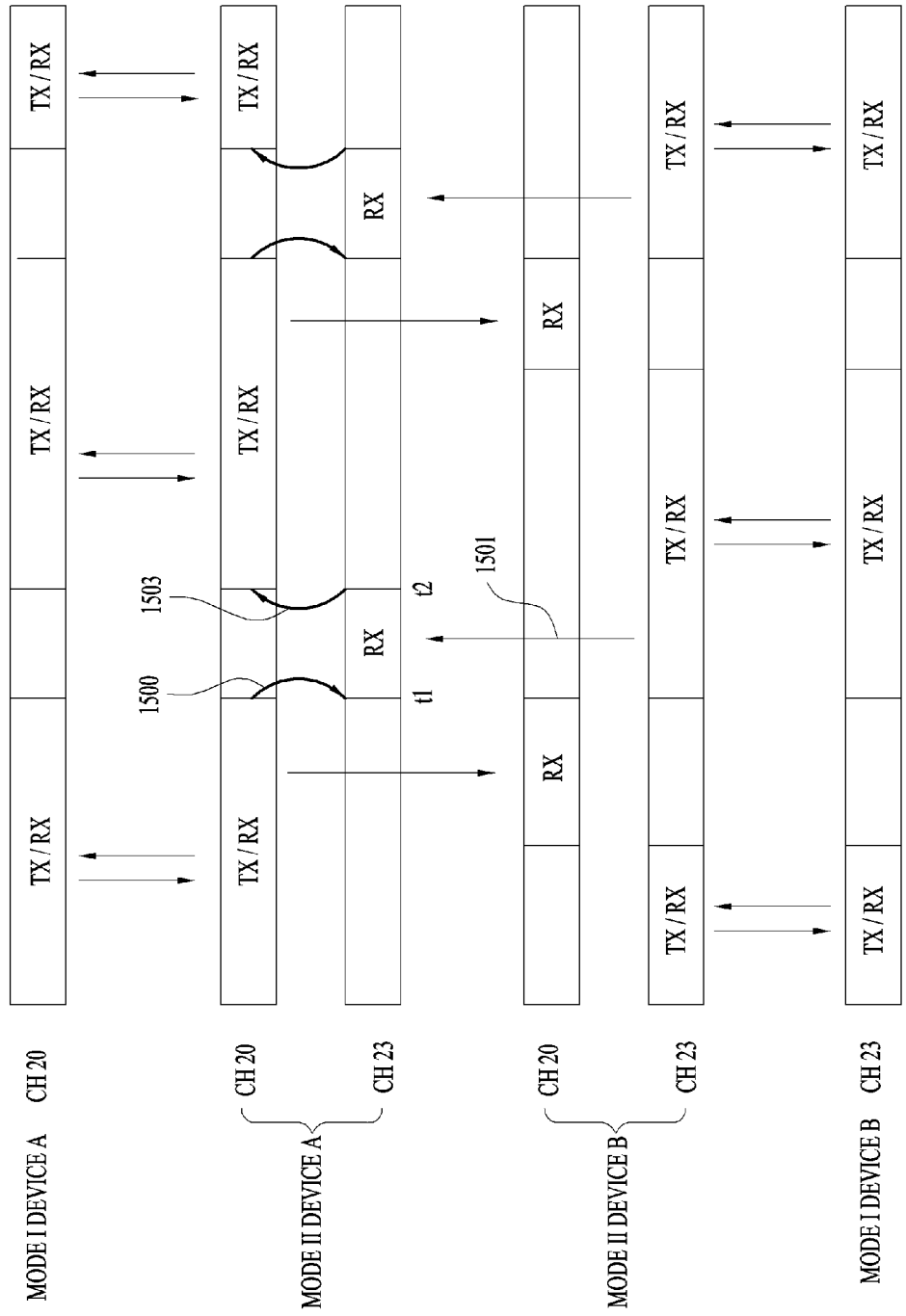
FIG. 15 is a diagram for explanation of transmission and reception of a signal between the same type of devices via FDM according to an embodiment of the present invention.

Referring to FIG. 15, a mode I device A and a device A may perform communicate using channel #20 (CH 20) and a mode I device B and a device B may perform communicate using channel #23 (CH 23). It can be seen that operating channels of the device A and the device B are different channels #20 and #23 (CH 20 and CH 23). Here, signal transmission between the mode I device and the device A and between the mode I device B and the device B may be performed via FDD as described with regard to the first embodiment. However, for convenience of description, a case corresponding to TDD is illustrated.

As seen from FIG. 15, the device A channel-switches (1500) on an operating band (channel) from channel #20 (CH 20) to channel #23 (CH 23) for time duration between t1 and t2. After switching the operating band to channel #23 (CH 23), the device A is maintained in a reception (RX) state. Channel #23 (CH 23) does not correspond to available channel information of the device A and thus cannot transmit (TX) a signal to the device B. During this time duration, the device B can transmit 1501 a signal to the device A. However, the device B cannot receive a signal from the device A. This is because channel #23 (CH 23) is available to the device B only and is not an available channel to the device A.

Then, it can be seen that the device A switches 1503 an operating channel to channel #20 (CH 20) from channel #23 (CH 23) and the device A and the mode I device A transmit and receive a signal on channel #20 (CH 20).

Similarly, the device B operates on channel #23 (CH23) as an operating channel of the device B and then may switch the operating channel to channel #20 (CH 20) in order to receive a signal from the device A.

Likewise, the device A switches the operating channel to the operating channel CH23 of the device B for predetermined time duration to operate in a reception mode only, and thus, the devices A and B can also communicate with each other when there is no available channel common to the two devices.

In order to support the aforementioned P2P communication, scheduling for operating channel switch is required. To this end, a predetermined multi-channel switch announcement information element may be used.

The multi-channel switch announcement information element may include switch information and channel number of a channel in which a device operating in an available channel is in a reception (RX) state after operating channel switch. That is, since the device A described with reference to FIG. 15 switches an operating channel to channel #23 for time duration between t1 and t2, the multi-channel switch announcement information element may include information regarding CH23 as the channel number and time duration t1 and t2 as the switch time information. The multi-channel switch announcement information element may be included in a beacon frame or a probe response frame.

When the mode I device A receives the multi-channel switch announcement information element, the mode I device A can know that the device A switches an operating channel to channel #23, the mode I device A does not transmit a signal to the device A for this time duration. The device B that receives the multi-channel switch announcement information element knows that the device A is in a reception (RX) state and can transmit a signal to the device A on channel #23 for time duration of t1 and t2.

An example of the multi-channel switch announcement information element is illustrated in FIG. 16.

Referring to FIG. 16, a switch mode field may indicate an operating state after and before an operating mode is switched. That is, the switch mode field may have three values of Rx Only, Tx Only, and Both Rx and Tx. In case of Rx Only, a device can perform only reception (Rx) in a channel after switching the operating channel. In case of Tx only, the device can perform only transmission (Tx). In addition, in case of Both Rx and Tx, the device can perform both Rx and Tx.

An operating class field indicates an operating class of a channel to be switched from an operating band.

A channel number field indicates a number of a channel to be switched from an operating band.

A switch offset field indicates a period of time to time when an operating band of a device is switched, from a current point of time. That is, a UE switches an operating band after a switch offset value elapses.

A switch duration field indicates operating time duration in a switched channel. When the operating time duration elapses, the operating band is switched back to a previous band.

A switch interval field indicates a time interval for continuous channel switches. That is, after channel switch, a device may switch an operating band after the switch interval.

A peer device address field may include a MAC address of a device with which a device transmitting this field intends to P2P-communicate.

A multi-channel switch announcement information element may include at least a portion of the aforementioned fields.

Figure 17:
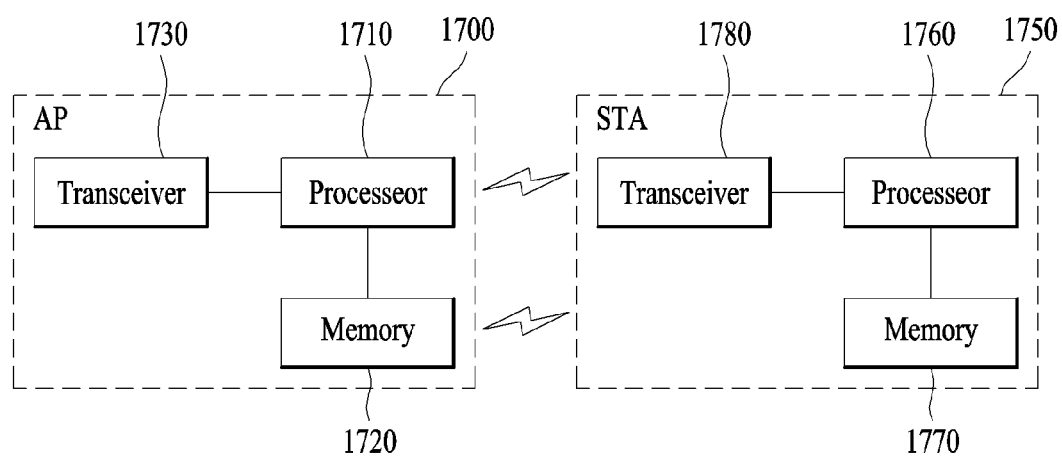
FIG. 17 is a block diagram illustrating a structure of a wireless device according to an embodiment of the disclosure.

FIG. 17 is a block diagram illustrating a structure of a wireless device according to an embodiment of the disclosure.

An AP 1700 may include a processor 1710, a memory 1720, and a transceiver 1730. An STA 1750 may include a processor 1760, a memory 1770, and a transceiver 1780. The transceivers 1730 and 1780 may transmit/receive a radio signal, and for example, may implement a physical layer according to the IEEE 802 system. The processors 1710 and 1760 are connected to the transceivers 1730 and 1760 to implement a physical layer and/or a MAC layer according to the IEEE 802 system. The processors 1710 and 1760 may control operations according to the aforementioned embodiments of the present invention. The processors 1710 and 1760 may configured to perform wireless communication through the transceivers 1730 and 1780. In addition, a module for embodying operation of the AP and the STA according to the above various embodiments of the disclosure may be stored in the memories 1720 and 1770 and executed by the processors 1710 and 1760. The memories 1720 and 1770 may be included in the processors 1710 and 1760 or installed outside the processors 1710 and 1760 and connected to the processors 1710 and 1760 via known means.

Detailed configurations of the aforementioned AP apparatus and STA apparatus may be applied so as to independently apply the detailed description based on the aforementioned various embodiments of the disclosure or to simultaneously apply two or more embodiments of the disclosure. A repeated description is omitted for clarity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

INDUSTRIAL APPLICABILITY

While the above-described embodiments of the present invention have been described based on IEEE 802.11 systems, the embodiments can be equally applied to various mobile communication systems.

The invention claimed is:

1. A method for receiving a signal, by a first device from a second device, using an unlicensed band in a wireless communication system, the method comprising:
   receiving, by the first device, available channel information comprising:
      one or more first available channels for the first device; and
      one or more second available channels for the second device;
   determining, by the first device, whether a common channel between the one or more first available channels and the one or more second available channels exists or not;
   when the common channel exists, receiving, by the first device, the signal from the second device through the common channel; and
   when the common channel does not exist:
      switching, by the first device, an operation band to a channel determined among the one or more second available channels; and
      receiving, by the first device, the signal from the second device through the determined channel.

2. The method of claim 1, wherein the first device broadcasts information regarding the determined channel.

3. The method of claim 2, wherein the information regarding the determined channel comprises at least one of information regarding a channel number of the determined channel, operating time duration in the determined channel, information regarding time duration up to switch to the determined channel, and information regarding an identifier of a device for transmitting a signal received from the determined channel.

4. A first device using an unlicensed band in a wireless communication system, the first device comprising:
   a transceiver; and
   a processor configured to:
      control the first device comprising the transceiver;
      receive available channel information comprising:
         one or more first available channels for the first device; and
         one or more second available channels for a second device;
      determine whether a common channel between the one or more first available channels and the one or more second available channels exists or not;
      when the common channel exists, receive the signal from the second device through the common channel; and
      when the common channel does not exist:
         switch an operation band to a channel determined among the one or more second available channels; and
         receive the signal from the second device through the determined channel.

5. The method of claim 1, wherein the one or more first available channels for the first device are determined based on a geo-location information of the first device.

* * * * *